US008644637B2

(12) United States Patent
Suga

(10) Patent No.: US 8,644,637 B2
(45) Date of Patent: Feb. 4, 2014

(54) IMAGE PROCESSING METHOD

(75) Inventor: Takeo Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/576,574

(22) PCT Filed: Mar. 8, 2011

(86) PCT No.: PCT/JP2011/055874
§ 371 (c)(1),
(2), (4) Date: Aug. 1, 2012

(87) PCT Pub. No.: WO2011/111852
PCT Pub. Date: Sep. 15, 2011

(65) Prior Publication Data
US 2012/0301043 A1 Nov. 29, 2012

(30) Foreign Application Priority Data

Mar. 11, 2010 (JP) ................................. 2010-054583

(51) Int. Cl.
*G06K 9/40* (2006.01)
*G06K 9/00* (2006.01)

(52) U.S. Cl.
USPC ......................................................... 382/264

(58) Field of Classification Search
USPC .......... 382/254, 255, 264; 250/216, 281, 282, 250/287, 288, 492.21
See application file for complete search history.

(56) References Cited

U.S. PATENT DOCUMENTS

| 5,043,570 A | * | 8/1991 | Takabayashi | 250/216 |
| 7,235,781 B2 | * | 6/2007 | Haase et al. | 250/288 |
| 7,351,983 B2 | * | 4/2008 | Sakaguchi | 250/396 R |
| 7,714,280 B2 | * | 5/2010 | Komatsu et al. | 250/287 |
| 8,395,116 B2 | * | 3/2013 | Harada et al. | 250/288 |
| 2006/0097197 A1 | * | 5/2006 | Sakaguchi | 250/492.21 |

(Continued)

FOREIGN PATENT DOCUMENTS

| JP | 63-236252 A | 10/1988 |
| JP | 3-44613 A | 2/1991 |

(Continued)

OTHER PUBLICATIONS

International Search Report (PCT/ISA/210) and Written Opinion of the Searching Authority (PCT/ISA/237) dated Apr. 20, 2011 in International Application No. PCT/JP2011/055874.

(Continued)

*Primary Examiner* — Amir Alavi
(74) *Attorney, Agent, or Firm* — Fitzpatrick, Cella, Harper & Scinto

(57) ABSTRACT

In a time-of-flight type, secondary ionization mass-spectrometry apparatus, spread of a primary beam irradiating a sample is calculated through a numeric or practical-experiment process, and the spread is used as a blurring function to restore an image to reduce blur. Provided is an image processing method of a mass-spectrum image derived by irradiating a surface of a sample with a converged short pulsed primary beam, while changing an irradiating position, to display two-dimensionally a signal intensity based on a ratio of mass to an electric charge relating to a mass spectrum, derived by a time-of-flight secondary ion mass spectrometer. The method includes the steps of: calculating a blurring function based on a shape of the primary beam incident on the surface of the sample; and restoring the mass-spectrum image based on the blurring function.

5 Claims, 14 Drawing Sheets

(56) References Cited

U.S. PATENT DOCUMENTS

2008/0277576 A1* 11/2008 Komatsu et al. .............. 250/287
2012/0298859 A1* 11/2012 Tanji et al. ................... 250/282
2012/0301043 A1* 11/2012 Suga ............................ 382/254
2012/0301045 A1* 11/2012 Suga ............................ 382/255

FOREIGN PATENT DOCUMENTS

| JP | 8-222168 A | 8/1996 |
| JP | 10-162766 A | 6/1998 |
| JP | 2005-98909 A | 4/2005 |
| JP | 2006-120331 A | 5/2006 |
| JP | 2007-051934 A | 3/2007 |
| JP | 2008-282726 A | 11/2008 |

OTHER PUBLICATIONS

Notification Concerning Transmittal of the International Preliminary Report on Patentability (PCT/IB/326) dated Sep. 20, 2012, issued in counterpart PCT Application No. PCT/JP2011/055874, International Preliminary Report on Patentability (PCT/IB/373), and Apr. 29, 2011 Written Opinion of the International Searching Authority (PCT/ISA/237).

* cited by examiner

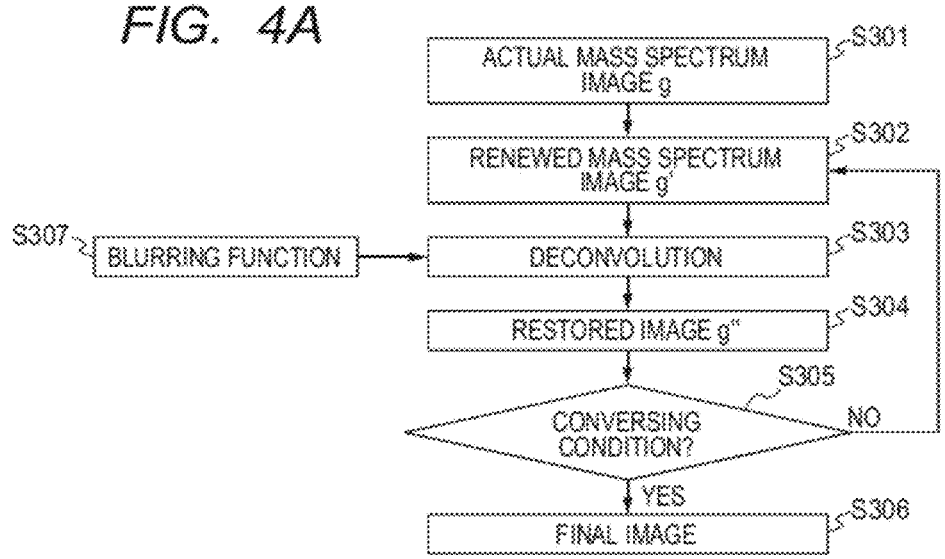
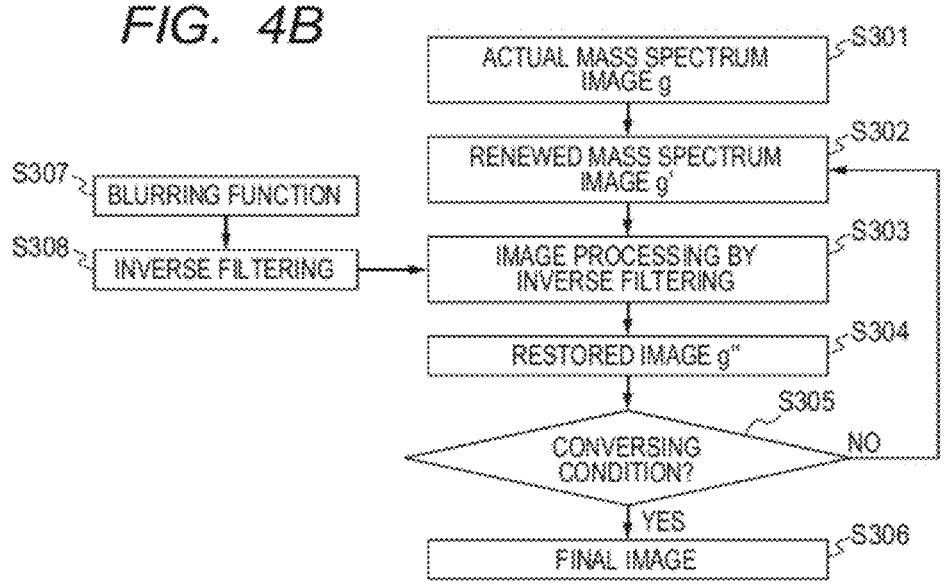

| | BLURRING FUNCTION | RESTORED IMAGE |
|---|---|---|
| COPPER GRID | 2958 | 3978 |

FIG. 10

| ITEM | | CONDITIONS |
|---|---|---|
| ACCELERATION VOLTAGE | | 30 kV |
| ION AND VALENCE NUMBER | | MONOVALENT POSITIVE ION |
| BEFORE BEAM BUNCHING | PULSE SHAPE | GAUSSIAN FUNCTION |
| | PULSE LENGTH | $-3\sigma_t \sim 3\sigma_t$: 300 n Sec |
| | BEAM PROFILE | LINEAR GAUSSIAN FUNCTION, $-3\sigma_s \sim 3\sigma_s$: 100 nm |
| AT BEAM BUNCHING | APPLIED VOLTAGE | 1 kV |
| | APPLIED RANGE | PULSE LENGTH |
| LENS | CHROMATIC ABERRATION OF LENS | 2 mm |
| | DIVERGENT FLUX ANGLE OF ION BEAM | 5 mrad |
| | MAGNIFICATION | SAME MAGNIFICATION |

| TIME [ns] | $\Delta E$ [kV] | $\Delta E/E_0$ | $\beta \cdot C_c$ [mm] | d [μm] |
|---|---|---|---|---|
| 0 | 0.000 | 0.000/30 | 0.01 | 0.000 |
| 50 | 0.167 | 0.167/30 | 0.01 | 0.056 |
| 100 | 0.333 | 0.333/30 | 0.01 | 0.111 |
| 150 | 0.500 | 0.500/30 | 0.01 | 0.167 |
| 200 | 0.667 | 0.667/30 | 0.01 | 0.222 |
| 250 | 0.833 | 0.833/30 | 0.01 | 0.278 |
| 300 | 1.000 | 1.000/30 | 0.01 | 0.333 |

FIG. 19A
FIG. 19B
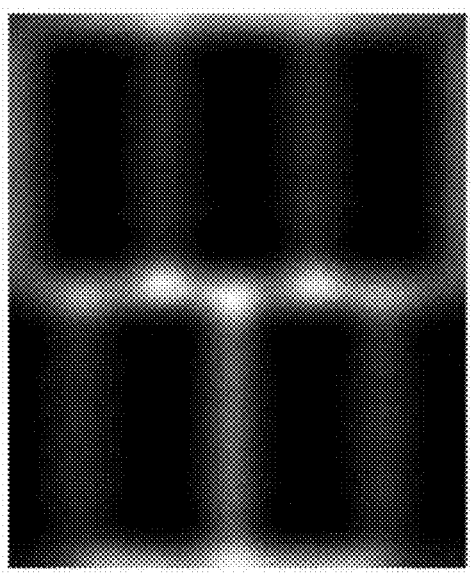
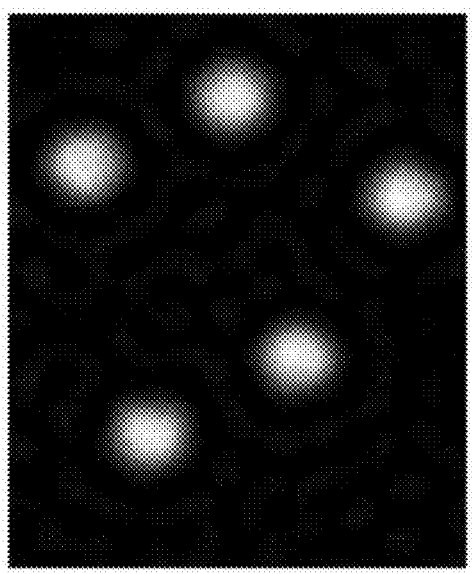
FIG. 20
|  | BLURRING IMAGE | RESTORED IMAGE |
|---|---|---|
| CELL MEMBRANE | 699 | 2530 |
| NUCLEUS | 964 | 1912 |

IMAGE PROCESSING METHOD

This Application is a 371 of PCT/JP2011/055874, filed on Mar. 8, 2011.

TECHNICAL FIELD

The present invention relates to a blur-reduction method of a mass-spectrum image derived by a time-of-flight secondary ion mass-spectrometry apparatus.

BACKGROUND ART

Methods of ionization without cleaving molecular compounds, such as a laser desorption/ionization method (LDI) and a matrix-assisted laser desorption/ionization method (MALDI), are put into practical use, and mass spectrometry is widely used particularly in a field of life science. Furthermore, mass-spectrum imaging, which is a method of two-dimensionally deriving a mass spectrum based on mass spectrometry while changing an irradiating position of a laser, is drawing attention. A secondary ion mass spectrometry (SIMS) has advantages because sample preparation is simple and high lateral resolution can be carried out for a converged primary ions beam. The SIMS is an ionization method for ionizing atoms and molecules by irradiating a sample with primary ions. A time-of-flight (TOF) mass spectrometer, which has wide measurement range, is often combined as an analyzer with SIMS and is used as a time-of-flight secondary ion spectrometry (TOF-SIMS).

The SIMS is classified into dynamic-SIMS and static-SIMS based on the difference in the amount of primary ions. In the dynamic-SIMS, a large amount of secondary ions is generated by sputtering a surface of a sample irradiating a large amount of primary ions. Meanwhile, in the static-SIMS, secondary ions, the molecular structure of which is maintained, are generated because the amount of primary ions is sufficiently smaller than the number of constituent elements of the surface. Plenty of information related to the molecular structure can be derived by the static-SIMS. Therefore, the static-SIMS is more advantageous than the dynamic-SIMS in the composition analysis of organic matters. Thus, the static-SIMS is usually used in the TOF-SIMS.

A pulsed laser is necessary to use a laser as a primary beam and a TOF detector as an analyzer. Therefore, a nitrogen laser that can generate a short pulse of about 100 ps width is favorably used.

The TOF-SIMS is usually equipped with a beam-bunching mechanism to realize high mass resolution. The beam bunching is a mechanism for compressing the pulsed beam to reduce the pulse width of the primary ion beam irradiating the sample. Thus, short-pulsed primary ions irradiate the surface of the sample at the same time. As a result, high secondary ion intensity is derived, and the mass resolution improves.

However, the speed of the primary ion beam widely varies if the beam bunching is performed. As a result, the beam diameter becomes large. In general, the primary-ion-beam irradiation system includes an ion source, a pulsing mechanism, a beam-bunching mechanism, and a converging lens. If the speed (or energy) of the primary ion beam widely varies due to the beam bunching, the effect of the chromatic aberration generated by a converging lens becomes large, and the convergence is insufficient. When the beam-bunching mechanism is implemented, the diameter of the primary ion beam irradiating the sample is usually about 2 μm. If the beam diameter of the primary ions beam becomes large, the spatial resolution of the derived two-dimensional image is reduced.

FIGS. 2A and 2B are schematic diagrams illustrating irradiation intervals of the pulsed primary ions and ion-generated areas. In the TOF-SIMS, the magnification of the mass-spectrum imaging is determined by a horizontal scanning interval 1 and a vertical scanning interval 2 of the primary ion beam. The secondary ions are generated from an irradiation area 3 of the primary ion beam. Therefore, secondary ion-generated areas do not overlap in low-magnification observation, because the irradiation intervals are sufficiently wide as illustrated in FIG. 2A. However, the irradiation intervals are narrow in high-magnification observation as illustrated in FIG. 2B. More specifically, the secondary ion-generated areas gradually start to overlap as the magnification is increased, and information of secondary ions generated from a substance at an adjacent position starts to be mixed. As a result, the spatial resolution of the mass-spectrum image is reduced.

Two methods can be considered to solve this.

One method is to correct a primary-ion-beam irradiation optical system to converge the ion beam. PTL 1 discloses a technique of using a correction lens to remove the influence of the spherical aberration and the chromatic aberration of the lens to converge the ion beam. However, the speed of the ion beam widely varies in the TOF-SIMS, and the correction-lens technique illustrated in a conventional example described in PTL 1 cannot be used as it is.

The other method is to restore a derived image. In general, image blur occurs to an image derived using an apparatus depending on an observation apparatus and an observation target. A method of removing the blur from the blurred image to obtain a clear image is widely known not only in a microscopic field, but also in telescopic and signal-processing fields. In such a case, an image-restoration algorithm is used. More specifically, the cause of the image blur is handled as a function to execute numerical processing to reduce the image blur. The function defining the cause of the image blur is called a "blurring function". PTL 2 discloses an image restoration of measuring spatial spread of the laser beam irradiating the surface of the sample in a scanning laser microscope and using the spatial spread as a blurring function. However, the measurement of the shape is difficult in the static-SIMS, because the intensity of the primary ion beam is weak. Therefore, it is difficult to measure the spatial spread and intensity of the beam as illustrated in the conventional example described in PTL 2 to use the spatial spread and intensity as a blurring function.

CITATION LIST

Patent Literature

PTL 1: Japanese Patent Application Laid-Open No. 2006-120331
PTL 2: Japanese Patent Application Laid-Open No. H03-044613

SUMMARY OF INVENTION

An issue is to provide a blur-reduction method of a mass-spectrum image derived by TOF-SIMS.

In the present invention, spread of a primary beam irradiating on a sample is calculated through a numeric or practical-experiment process in TOF-SIMS, and a blurring function is used to restore an image and to reduce blur.

More specifically, provided is an image processing method of a mass-spectrum image derived by irradiating a surface of a sample with a converged short-pulsed primary beam, while changing an irradiating position, to display two-dimensionally a signal intensity based on a ratio of mass to an electric charge relating to a mass spectrum, derived by a time-of-flight secondary ion mass spectrometer, wherein the method comprising steps of: calculating a blurring function based on a shape of the primary beam incident in the surface of the sample; and restoring the mass-spectrum image based on the blurring function.

According to an image blur-reduction method of a mass-spectrum image derived by TOF-SIMS of the present invention, an estimated blurring function is used to execute image processing to reduce image blur of the mass-spectrum image, and a clear image can be obtained.

Further features of the present invention will become apparent from the following description of exemplary embodiments with reference to the attached drawings.

BRIEF DESCRIPTION OF DRAWINGS

FIGS. 4A and 4B are flow charts of a method culminating in the restoring of the derived mass-spectrum image using a blurring function.

FIG. 10 is a table illustrating irradiation conditions.

FIGS. 19A and 19B show restored images obtained by restoring the mass-spectrum image.

FIG. 20 shows the result of comparison of the blurred image and the restored image.

DESCRIPTION OF EMBODIMENTS

Hereinafter, the present invention will be described in more detail by illustrating embodiments. Although the following specific examples are examples of exemplary embodiments of the present invention, the present invention is not limited to the specific embodiments.

The present invention provides an image processing method of processing a mass-spectrum image derived by irradiating a surface of a sample with a converged short-pulsed primary beam, while changing an irradiating position, to display two-dimensionally a signal intensity based on a ratio of mass to an electric charge relating to a mass spectrum, derived by a time-of-flight secondary ion mass spectrometer, the method comprising steps of: calculating a blurring function based on a shape of the primary beam incident in the surface of the sample; and restoring the mass-spectrum image based on the blurring function.

The time-of-flight secondary ion mass spectrometer (TOF-SIMS) is a mass spectrometer including SIMS as an ionization unit and TOF as a detection unit. The TOF-SIMS can irradiate a surface of a sample with a primary ion beam while changing an irradiation position to display two-dimensionally a signal intensity based on a ratio of mass to an electric charge, and an image derived this way is called a mass-spectrum image.

The primary ion beam is a beam for irradiating a sample with primary ions. If the primary ion beam irradiates the surface of the sample, part of the atoms in the sample that has received energy pops up when the primary ion beam irradiates the surface of the sample, and the part of the atoms is charged and becomes secondary ions.

Figure 3:
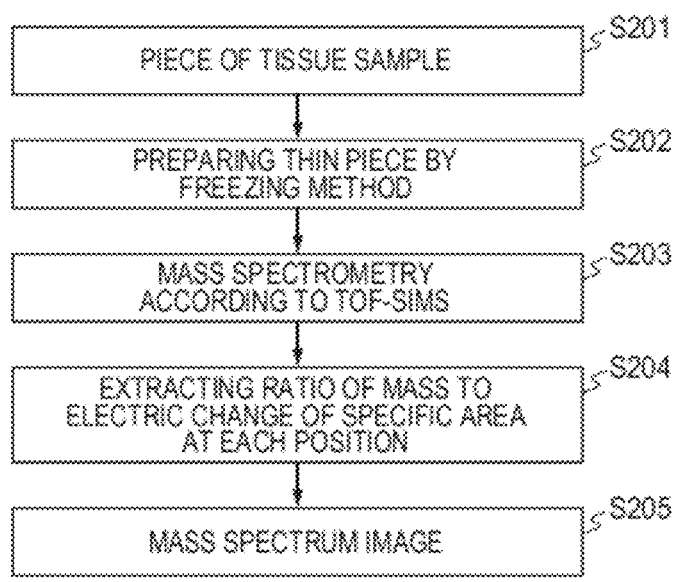
FIG. 3 is a flow chart showing a process culminating in the deriving of mass-spectrum image.

FIG. 3 is a flow chart of the steps from mass spectrometry of an observed sample by the TOF-SIMS to formation of a mass-spectrum image.

An extracted piece of tissue sample (S201) is frozen, and a thin piece is prepared by a microtome (S202). After the thin piece is mounted on a sample carrier, mass spectrometry (S203) is performed by the TOF-SIMS. A signal intensity of mass to an electric charge of a specific area is derived from mass-spectrometry data at each position (S204), and a mass-spectrum image (S205) is obtained.

Figure 1A:
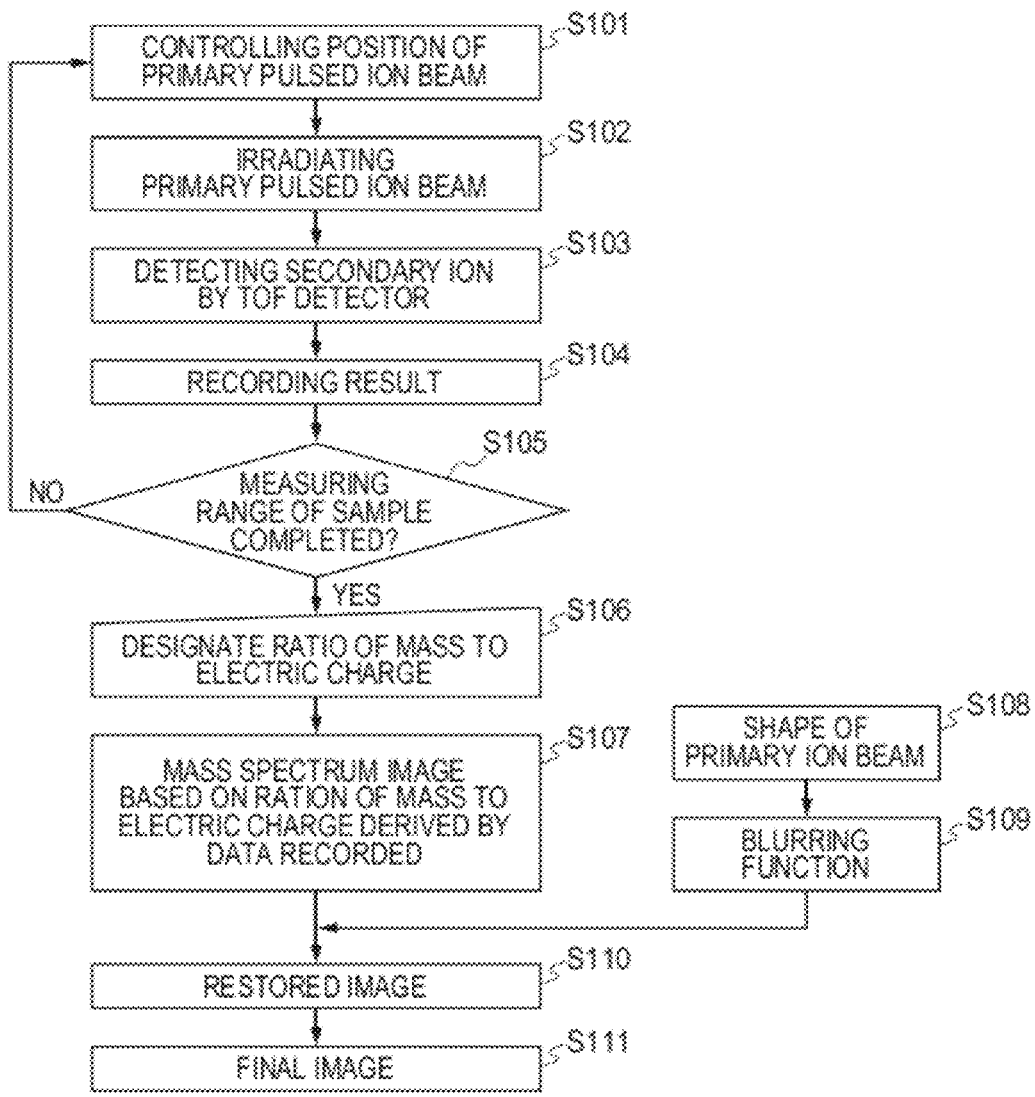
FIGS. 1A and 1B are diagrams for illustrating a blur-reduction method of a mass-spectrum image according to an embodiment of the present invention.
Figure 1B:
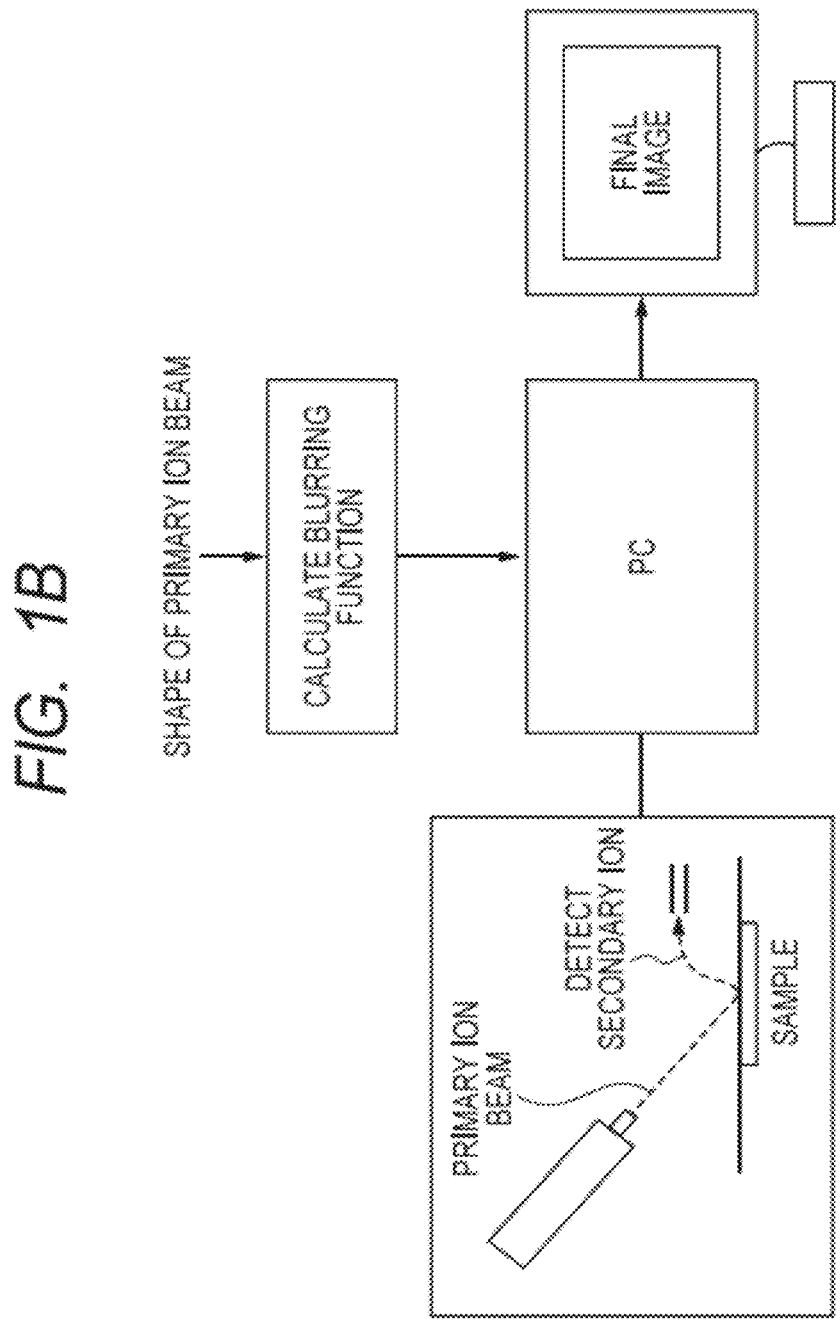
Figure 2A:
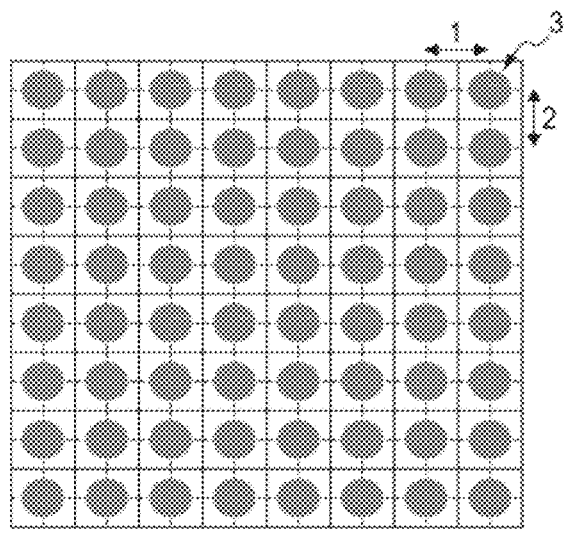
FIGS. 2A and 2B are schematic diagrams of primary ion beams irradiated on a sample.
Figure 2B:
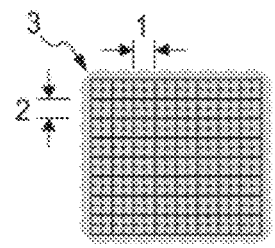

FIGS. 1A and 1B illustrate a flow chart of using the TOF-SIMS to acquire a mass-spectrum image, restoring an image, and obtaining a final image. After the position of a pulsed primary ion beam is controlled (S101), a primary ion beam is irradiated (S102), generated secondary ions are detected with a TOF detector (S103), and a derived mass spectrum is recorded in a recording medium (S104). S101 to S104 are repeated until the measurement of a desired range is completed. Once the measurement is completed, the mass to electric charge is designated (S106), the intensity of the designated mass to electric charge designated from the measured mass spectrum is extracted, and a mass-spectrum image is obtained (S107). The shape of the primary ion beam is predicted from the irradiation conditions (S108), a blurring function is calculated (S109), and the blurring function is used to restore the image. S107 and S109 are used to restore the image (S110), and a final image with reduced blur is obtained (S111).

In general, a derived image g is defined by the following formula based on a real image f, a blurring function h, and noise n.

Math. 2

$$g = h*f + n \qquad 2$$

In the formula, * denotes a convolution operator. Estimation of f from the actual mass-spectrum image g is necessary to reproduce the original structure of the observed sample.

Deconvolution as in a conceptual diagram of steps illustrated in FIG. 4A can be used for the estimation. The actual mass-spectrum image (S301) and the blurring function (S307) are used to perform deconvolution (S303), and a restored image (S304) is obtained. Whether the deconvolution is performed for a designated number of times is determined (S305), and S302 to S304 are repeated until the conditions are satisfied. Ultimately, a final image S306 is output.

In the image restoration, the same effect can be attained by calculating an inverse function of the blurring function h as in a conceptual diagram of steps illustrated in FIG. 4B and by using the function as an inverse filter (S308) to perform image processing.

The blurring function defines the cause of the image blur as a function. The blurring function according to the present invention will be described below.

The blurring function is calculated from a mechanism of generating image blur, and a unique blurring function exists in the SIMS using the TOF detector. The blurring function allows direct or indirect calculation of the spread of the primary ion beam through a practical-experiment process. In an example of the method of indirect calculation, the shape of a crater generated by sputtering of a pulsed primary ion beam irradiated on a smooth silicon substrate is measured, and a blurring function reflecting the shape is used. In another method of calculating the blurring function, the spread of the primary ion beam can be calculated through numeric calculation.

EXAMPLES

Example 1

To indirectly calculate the spread of the primary ion beam, a pulsed primary ion beam irradiates a smooth silicon substrate, and the shape of a crater generated by sputtering is measured.

Figure 5:
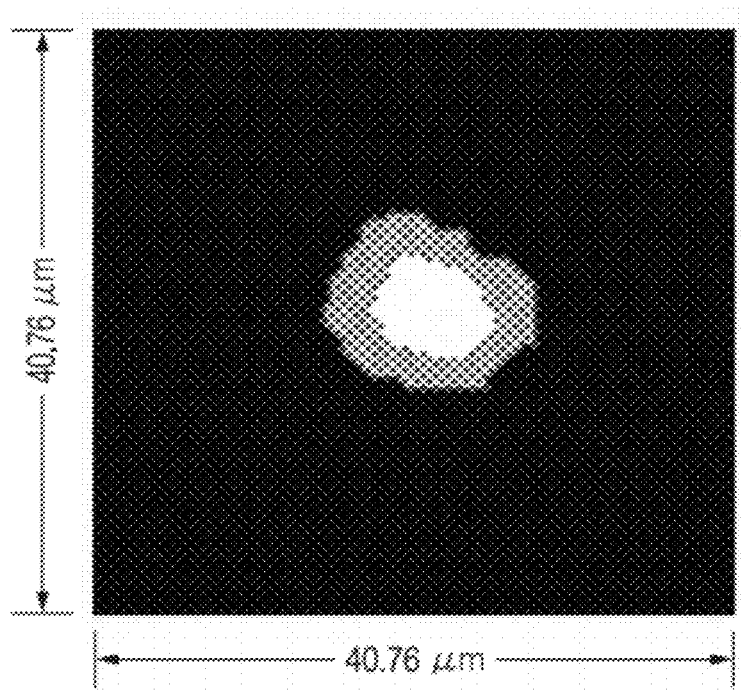
FIG. 5 is an image illustrating a shape of a crater of a primary ion beam.

FIG. 5 is an optical microscopic image of the crater formed by continuously applying the primary ion beam to the same part of the smooth silicon substrate. The size of the image is 40.76 μm long×40.76 μm wide. The image density is approximately proportional to the number of primary ions, because the image is a sputter mark based on the primary ion beam. Thus, the image can be used as a blurring function.

Figure 6:
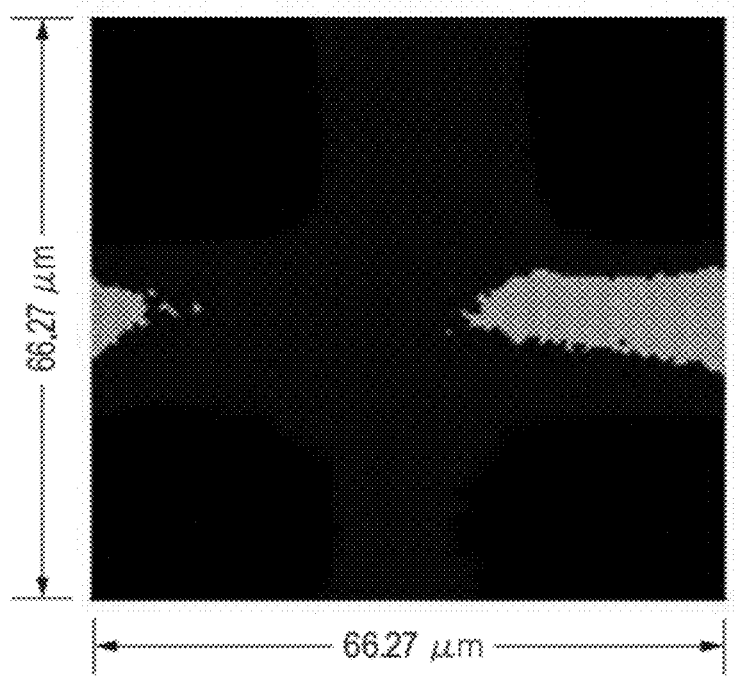
FIG. 6 is a derived mass-spectrum image.

FIG. 6 is a mass-spectrum image of a copper grid derived from an area of 66.27 μm long×66.27 μm wide. In the image, the brightly displayed part indicates copper.

The mass-spectrum image illustrated in FIG. 6 is restored in accordance with FIGS. 4A and 4B based on the blurring function illustrated in FIG. 5.

Image processing software ImageJ developed by the National Institute of Health of the United States of America is used to restore the image. Parallel Iterative Deconvolution developed by Prof. Piotr Wendykier of Emory University is used as a plug-in of the process.

Figures 7, 8:
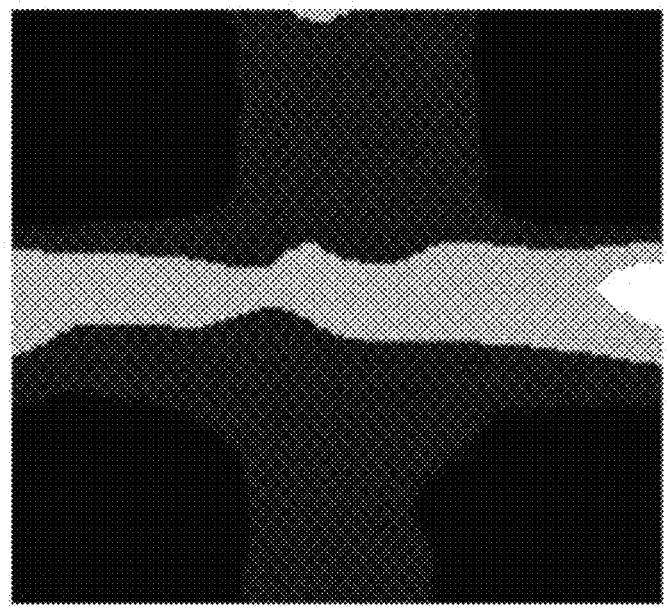
FIG. 7 is a restored image obtained by restoring the derived mass-spectrum image.
FIG. 8 is a result of comparison of a blurred image and the restored image.

FIG. 7 is a restored image of the copper grid. When FIG. 6 illustrating the blurred image and FIG. 7 illustrating the restored image are compared, it can be recognized that the restored image is clear.

The degrees of image blur of the original image and the restored image are evaluated in accordance by focus measurement. A gray-level variance method is adopted as the focus measurement. The gray-level variance method is a method of determining that the image is focused if a variance of pixel values $\sigma^2$ is greater.

Math. 3

$$\sigma^2 = \frac{1}{M \times N} \sum_{x=0}^{M} \sum_{y=0}^{N} [D(x, y) - \mu]^2$$

Formula 3

In the formula, M and N denote the numbers of pixels in x and y directions respectively, D(x, y) denotes pixel values of pixels, and μ denotes an average value of the pixels.

FIG. 8 illustrates values of focus measurement in the blurred image and the restored image. The values are 2958 and 3978, respectively, based on comparison by the gray-level variance method, and it can be determined that the restored image is more focused than the blurred image.

The value of the restored image is also greater than the value of the original image in this method, and the effect of the image restoration is indicated.

The method of indirectly calculating the shape of the primary ion beam has been described. The spread of the beam can be indirectly calculated in a similar method when a laser beam is used as the primary beam, and the spread can be used as a blurring function for restoring the image.

Example 2

In the SIMS using the TOF detector, the secondary ions need to be generated by simultaneously irradiating the sample with the primary ion beam to realize high mass resolution. Therefore, the pulse width of the primary ion beam is shortened so that a plurality of primary ions is incident in the surface of the sample at the same time.

The beam bunching is used to shorten the pulse of the primary ion beam. The beam bunching denotes convergence of the beam in the travelling direction to shorten the pulse. A beam-bunching mechanism is usually incorporated into the primary-ion-beam irradiation system in the SIMS. The beam-bunching mechanism simultaneously irradiates the surface of the sample with the short pulse primary ions. As a result, high secondary ion intensity is obtained, and the mass resolution improves.

Figure 9:
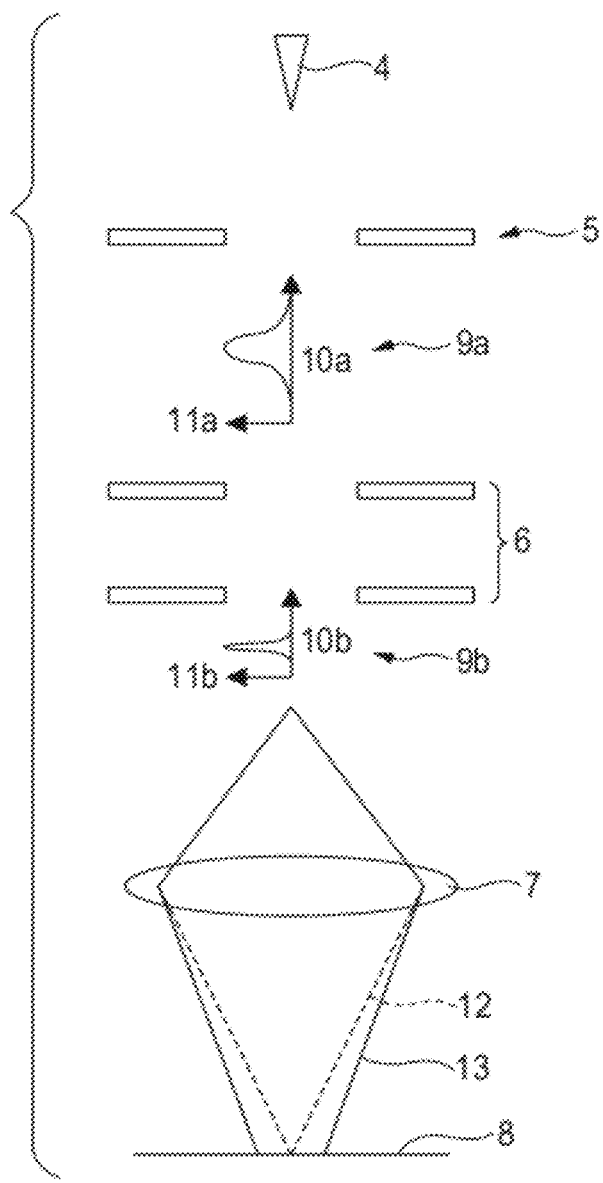
FIG. 9 is a diagram illustrating a configuration of a TOF-SIMS apparatus.

As illustrated in FIG. 9, the primary-ion-beam irradiation system of the TOF-SIMS includes an ion source 4, a pulsing mechanism 5, a beam-bunching mechanism 6, and a converging lens 7. The pulsing mechanism 5 divides a continuous primary ion beam generated by the ion source 4 into long pulse beams 9a of about 300 n seconds. The number of ions 11a changes over time 10a. The pulsing mechanism 5 is often operated by modulation of the electric field.

The beam-bunching mechanism 6 compresses the generated long pulsed beam 9a in the travelling direction to form a short pulse 9b. In the mechanism, a weak voltage is applied to the ions at the front in the travelling direction, and a strong voltage is applied to the ions at the back in the travelling direction. Therefore, the speed of the ions increases if a stronger voltage is applied, and the ions in the back gradually approach the front. Thus, the number of ions per unit time increases as the relationship between time 10b and the number of ions 11b.

While high mass resolution is attained by the mechanism, there is a problem that it is difficult to obtain a converged ion beam on a sample surface 8. The reason is that fast ions 13 have an effect (chromatic aberration) which makes the convergence more difficult compared to slow ions 12 based on a magnetic or static lens used to converge the primary ion beam.

When a plurality of primary ions with various speeds is emitted from one point, an extended radius d on a Gaussian plane when the ions are converged through a lens with a chromatic aberration factor $C_c$ is expressed by the following formula.

Math. 4

$$d = M \cdot \alpha \cdot C_c \cdot \frac{\Delta E}{E_0} \quad \text{Formula 4}$$

In the formula, $E_0$ denotes an acceleration voltage of ions, $\Delta E$ denotes a variation of kinetic energy including ions, $\alpha$ denotes a divergent angle from a point source of light on an object plane, and M denotes a magnification of the lens.

The pulsed primary ion beam can be defined by a three-dimensional spread by expressing the travelling direction as a z axis and the surface perpendicular to the travelling direction as x and y axes. After the beam bunching, it is stated that the beam is narrow in the z axis direction due to the applied electric field and that the beam is extended to the x-y plane due to the chromatic aberration. It is more convenient to define the travelling direction z of the ions by time t, and hereinafter, the travelling direction z will be handled as a function of the time t.

The spread of the pulsed ions in the travelling direction before the beam bunching is empirically defined by a Gaussian distribution. The number of ions S(t) at the time t is expressed as the following formula.

Math. 5

$$S(t) = \frac{S}{\sigma_t \sqrt{2\pi}} e^{-\frac{1}{2}\left(\frac{t}{\sigma_t}\right)^2} \quad \text{Formula 5}$$

In the formula, S denotes the number of all ions in the pulse, and $\sigma_t$ denotes a standard deviation.

The ions included per unit time extend in a two-dimensional Gaussian distribution on a plane perpendicular to the travelling direction, and the ions are expressed by the following formula.

Math. 6

$$N(x, y, t) = \frac{S(t)}{\sigma_s^2 \sqrt{2\pi}} e^{-\frac{1}{2}\left(\frac{x^2+y^2}{\sigma_s^2}\right)} \quad \text{Formula 6}$$

In the formula, x and y denote coordinates, and t denotes time. Furthermore, $\sigma_s$ denotes a standard deviation.

In the beam-bunching mechanism, 0V is applied to the front-end edge of the pulse ion, and a predetermined voltage E_b is applied to the ion beam at the back-end edge. During this time, since the electric field continuously changes, an applied voltage $\Delta E$ is a function of the time t. An extended radius d(t) based on a chromatic aberration Cc of the lens is as in the following formula which is obtained by changing Formula 3.

Math. 7

$$d(t) = \beta \cdot Cc \cdot \frac{\Delta E(t)}{E_0} = \beta \cdot Cc \cdot \frac{E\_b}{E_0} \frac{t}{pulsewidth} \quad \text{Formula 7}$$

In the formula, pulsewidth denotes a pulse width, $\beta$ denotes an irradiation angle, and there is a relationship of $\beta = M\alpha$.

The two-dimensional distribution of the number of ions at the time t on the coordinates x and y has a three-dimensional shape N(x, y, t), and this distribution is extended by Formula 7. More specifically, when N(x, y, t) is extended by d(t), the number of ions $N_d$(x', y', t) in a circle with the radius d is N(x, y, t)/d(t) (where $x'^2+y'^2<d(t)^2$), and the two-dimensional distribution of the short-pulsed ion beam at the time t is the sum of the entire plane space.

Math. 8

$$N'(x, y, t) = \sum_{x,y} \sum_{x',y'}^{x'^2+y'^2<d(t)^2} N_d(x', y', t) \quad \text{Formula 8}$$

$$= \sum_{x,y} \sum_{x',y'}^{x'^2+y'^2<d(t)^2} \frac{N(x, y, t)}{d(t)}$$

The distribution (shape I (x, y)) of the primary ion beam incident in the surface of the sample or substrate is the sum of the N' (x, y, t) in the entire time, and the shape is as follows.

Math. 9

$$I(x, y) = \sum_{t=0}^{pulsewidth} N'(x, y, t) \quad \text{Formula 9}$$

Based on Formulas 6, 7, and 8, the two-dimensional distribution I (x, y) of the primary ion beam incident in the sample surface 8 in FIG. 9 is defined as a following Formula 1:

Math. 1

$$I(x, y) = \sum_{t=0}^{pulsewidth} \sum_{x,y} \sum_{x',y'}^{x'^2+y'^2<d(t)^2} \frac{N(x, y, t)}{\beta \cdot Cc \cdot \frac{E\_b}{E_0} \frac{t}{pulsewidth}}, \quad \text{Formula 1}$$

wherein I (x,y) is a shape of the primary beam, "pulsewidth" is a pulsed width (second), t is a timing (second) within the pulse, $E_0$[V] is an acceleration voltage, Cc[m] is a chromatic aberration factor of a converging lens, $\beta$ [rad] is an irradiation angle, N (x,y,t) is a three dimensional shape of a two dimensional distribution of numbers of ions at time t, Eb [V] is application voltage for the beam bunching The spread of the primary ion beam under the conditions in FIG. 10 is calculated through numeric calculation. Irradiation in one dimension is considered here for simplification.

Figure 11:
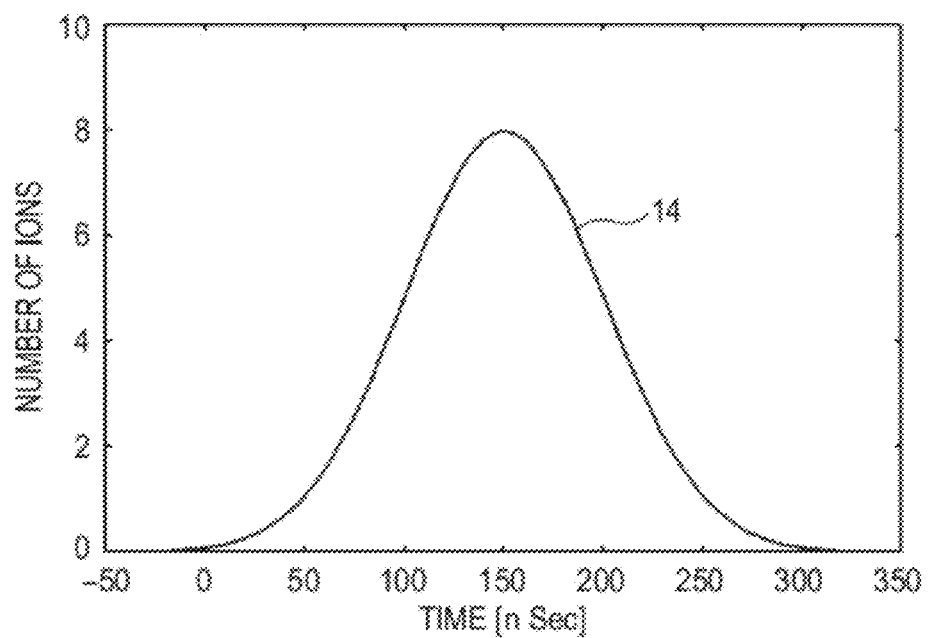
FIG. 11 is a graph of the number of primary ions depending on the time.

FIG. 11 illustrates a relationship 14 between time and the number of ions, and 1000 ions are included through the entire time. It can be recognized that the number of ions in the pulsed beam is the maximum at time 150 n seconds and that the number of ions decreases toward the first (time 0 n second) and the last (time 300 n second) of the pulse in the distribution.

Figure 12:
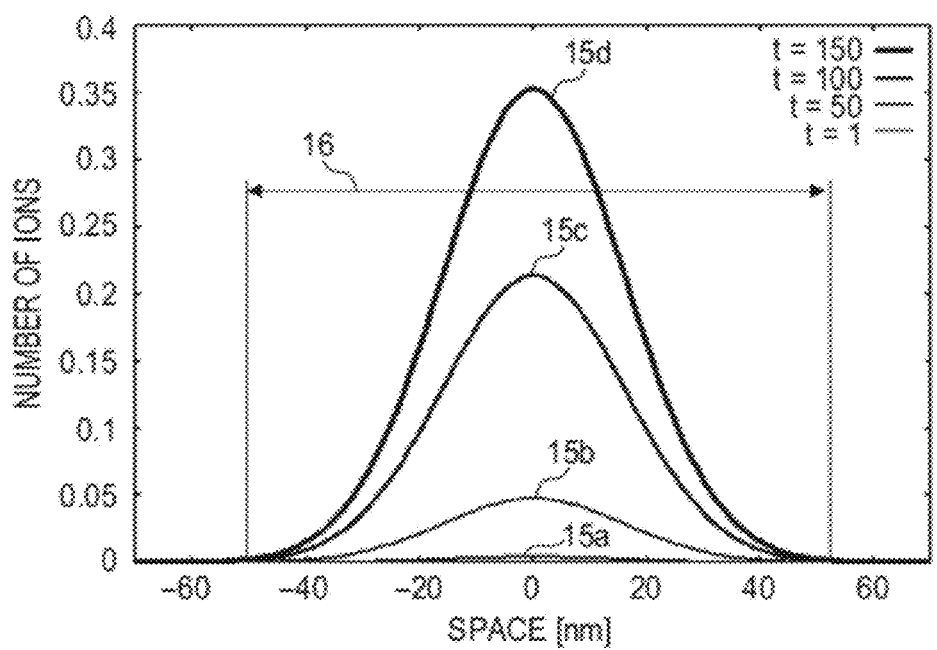
FIG. 12 is a graph illustrating spatial distributions of primary ions at each time.

In FIG. 12, 15*a* to 15*d* denote the numbers of ions on a plane perpendicular to the travelling direction at times 1, 50, 100, and 150 n seconds, respectively. A spatial spread 16 is 6 times the standard deviation. As illustrated in FIG. 12, it can be recognized that the number of ions increases over time until the time 150 n seconds. Since the distribution is a Gaussian distribution, the numbers of ions at 200, 250, and 300 seconds are the same as those at 100, 50, and 0 seconds, respectively.

Figures 13, 14:
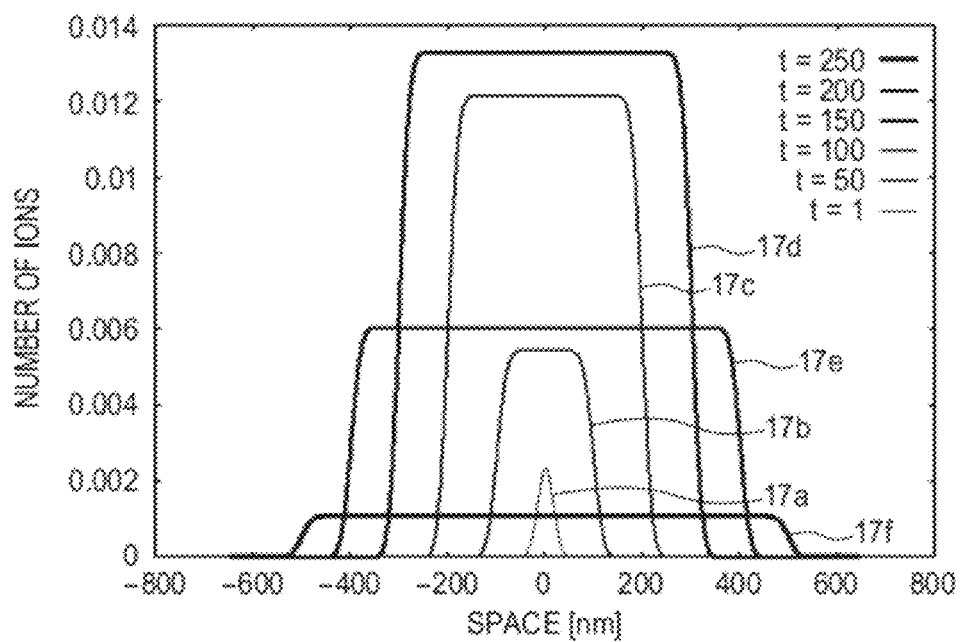
FIG. 13 is a table summarizing spread of a beam caused by beam bunching.
FIG. 14 is a graph illustrating results of spread of beam diameters at each time due to beam bunching.

FIG. 13 illustrates a result of calculating the spread of the primary ion beam based on Formula 7. In FIG. 13, ΔE denotes a voltage applied during beam bunching, and $E_0$ denotes an initial acceleration voltage of the ion beam. Beam bunching is not performed at the time 0 ns, and there is no blur caused by the chromatic aberration of the lens. Therefore, the extended radius d of the beam is 0. The applied voltage ΔE caused by beam bunching increases along with the time t, and it can be recognized from the table that the beam diameter is also extended over time. The extended radius d of the beam is 167 nm at the time 150 n seconds at which time the number of ions is the greatest, and the extended radius d extends to 333 nm at the time 300 n seconds.

In FIG. 14, 17a to 17f denote spread of the primary ion beam due to the beam bunching and indicate shapes at 1, 50, 100, 150, 200, and 250 ns, respectively. The spread is extremely little at the time 1 n second (17a), and the Gaussian distribution is maintained. The beam bunching greatly affects the spread along with the time, and it can be recognized that the distribution of the ions becomes flat.

Figure 15:
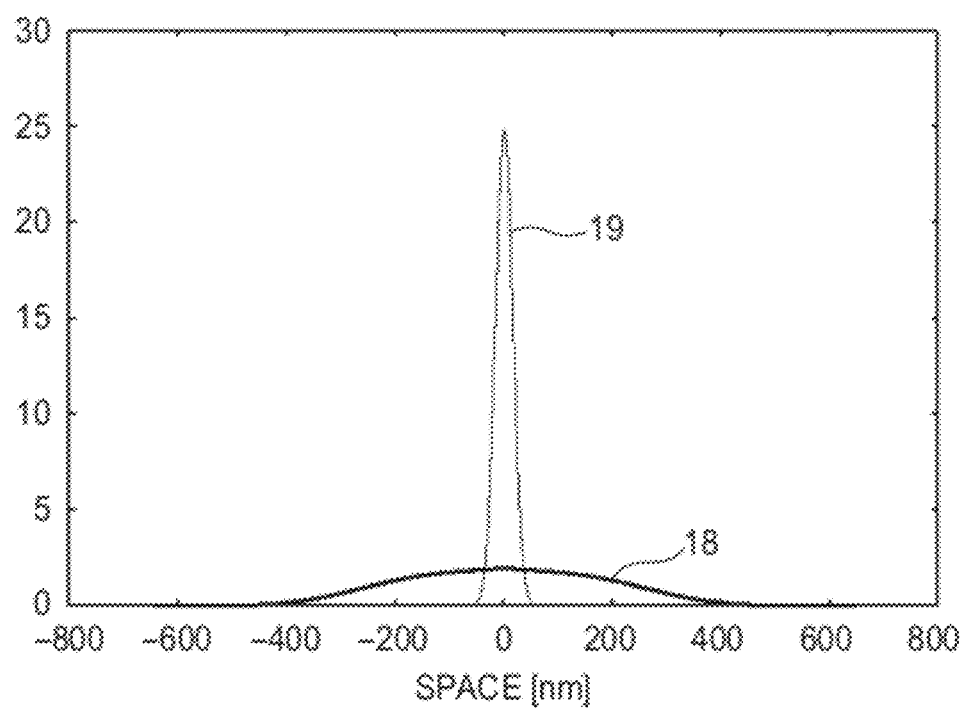
FIG. 15 is a graph illustrating shapes of beams when the ion beams reach the sample.

FIG. 15 illustrates ion distributions when the primary ion beam is incident on the surface of the sample. A case 18 in which the beam bunching is performed and a case 19 in which the beam bunching is not performed are described. It can be recognized that the beam shape maintains the Gaussian distribution when the beam bunching is not performed and that a wide beam, in which the maximum intensity is about 1/10 and the spread is about 8 times, irradiates the surface of the sample when the beam bunching is performed.

In this way, it can be recognized through the numeric calculation that it is difficult to converge the primary ion beam due to the influence of the beam bunching in the TOF-SIMS.

In the restoration of the mass-spectrum image derived by the TOF-SIMS, the spread of the primary ion beam irradiating on the sample can be numerically calculated, and the calculated spread can be used as a blurring function.

Figure 16:
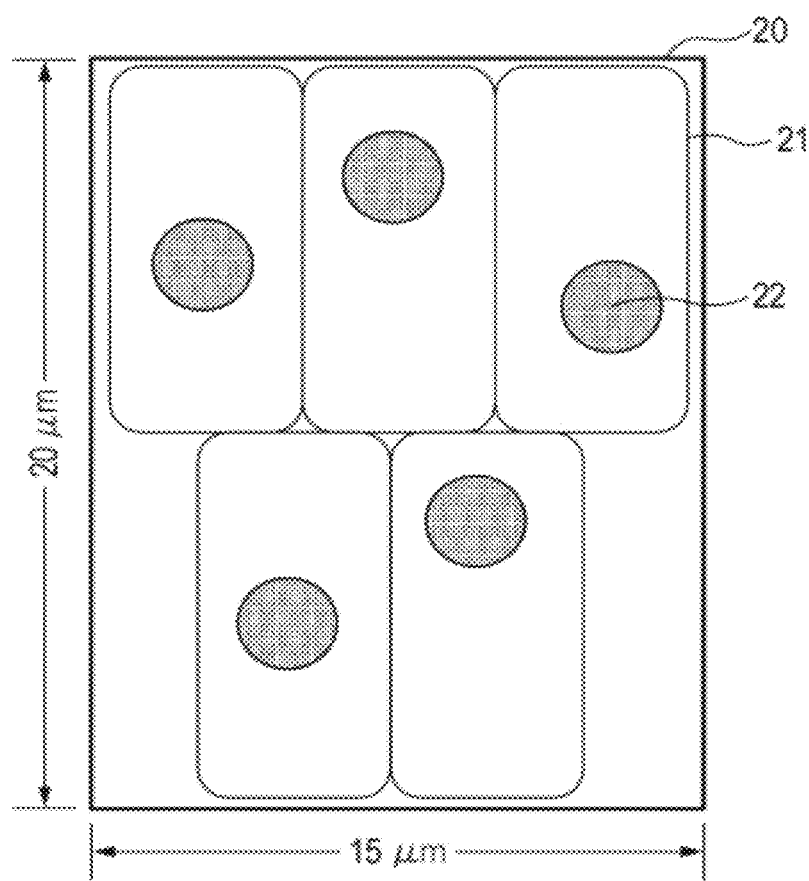
FIG. 16 shows a model image of cells.
Figure 17A:
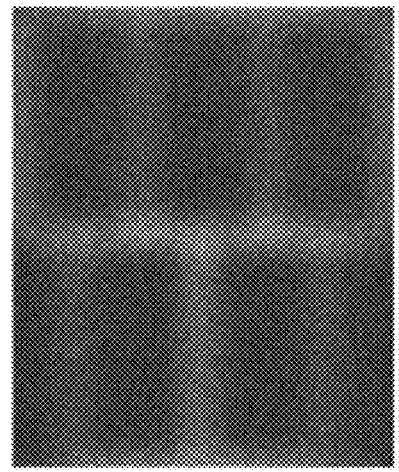
FIGS. 17A and 17B show model images of the mass-spectrum image.
Figure 17B:
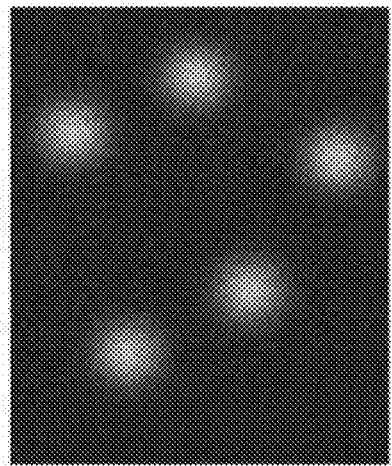

FIG. 16 depicts a model 20 of cells, cell membranes 21, and nuclei 22. The size of the image is 20 μm long×15 μm wide. FIGS. 17A and 17B schematically illustrate mass-spectrum image in which cell membranes and nuclei of the cells can be seen, respectively.

Figure 18:
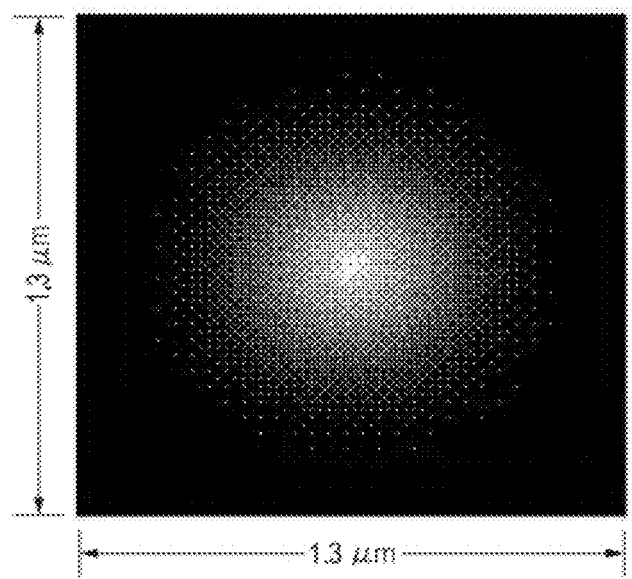
FIG. 18 shows a shape of an ion beam spread by beam bunching.

FIG. 18 illustrates a shape of 1000 primary ion beams incident on the surface of the sample. The conditions of the primary ion beams are the same as in FIG. 10. FIG. 18 illustrates that the brighter the image is, the greater is the number of ions. The width is 1.3 μm×1.3 μm.

The blurring function is used to restore the mass-spectrum image illustrated in FIGS. 17A and 17B in accordance with FIGS. 4A and 4B.

Image processing software ImageJ developed by the National Institute of Health of the United States of America is used to restore the image. Parallel Iterative Deconvolution developed by Prof. Piotr Wendykier of Emory University is used as a plug-in of the process.

FIGS. 19A and 19B illustrate restored images of the cell membranes (a) and the nuclei (b), and it can be recognized that the images as a whole are clearer than the blurred images illustrated in FIGS. 17A and 17B.

For the blurred images illustrated in FIGS. 17A and 17B and the restored images illustrated in FIGS. 19A and 19B, focus measurement is performed based on a gray-level variance method.

As illustrated in FIG. 20, when FIG. 17A illustrating a blurred image of cell membranes and FIG. 19A illustrating a restored image are compared by the gray-level variance method, the values are 699 and 2530, respectively, and it can be determined that the restored image is more focused than the blurred image. When FIG. 17B illustrating a blurred image of nuclei and FIG. 19B illustrating a restored image are compared, the values are 964 and 1912, respectively, and it can be determined that the restored image is more focused than the blurred image.

In this way, the effect of the image restoration based on the blurring function used is illustrated.

Meanwhile, the primary-ion-beam irradiation system of the TOF-SIMS may not include the beam-bunching mechanism. In this case, the spread of the primary ion beam is not generated through a theoretical analysis process (or in theoretical design). However, the structures of the pulsing mechanism and the converging lens are not simple, and an unexpected spread of the primary ion beam may emerge. In this case, for example, the spread of the primary ion beam is calculated through a practical-experiment process or is indirectly calculated. The obtained result can be used as a blurred image to restore the mass-spectrum image derived by the TOF-SIMS.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-054583, filed Mar. 11, 2010, which is hereby incorporated by reference herein in its entirety.

The invention claimed is:

1. An image processing method of processing a mass spectrum image derived by irradiating a surface of a sample with a converged short pulsed primary beam, while changing an irradiating position, to display two-dimensionally a signal intensity based on a ratio of mass to an electric charge relating to a mass spectrum, derived by a time-of-flight secondary ion mass spectrometer, the method comprising the steps of:

calculating a blurring function based on a shape of the primary beam incident in the surface of the sample; and restoring the mass spectrum image based on the blurring function.

2. The image processing method according to claim 1, wherein, in the step of calculating the blurring function, where the shape of the primary beam is denoted by I(x,y), the blurring is calculated, as the blurring function, according to a following formula (1):

$$I(x,y) = \sum_{t=0}^{pulsewidth} \sum_{x,y} \sum_{x',y'}^{x'^2+y'^2<d(t)^2} \frac{N(x,y,t)}{\beta \cdot Cc \cdot \frac{E\_b}{E_0} \frac{t}{pulsewidth}}, \quad (1)$$

wherein the pulsewidth is a pulsed width (second), t is a timing (second) within the pulse, $E_0$[V] is an acceleration voltage, Cc [m] is a chromatic aberration factor of a converging lens, β [rad] is an irradiation angle, N (x,y,t) is a three dimensional shape of a two dimensional distribution of numbers of ions at time t, Eb [V] is application voltage for the beam bunching, and wherein the mass spectrum image is recovered based on the blurring function.

3. The image processing method according to claim 1, wherein in the step of calculating the blurring function, the shape of the primary beam incident on the surface of the sample is calculated, based on an optical microscopic image of a crater formed by the irradiation of the surface of the sample with the primary beam.

4. The image processing method according to claim 1, wherein
the primary beam is an ion beam.

5. The image processing method according to claim 1, wherein
the primary beam is a laser beam.

\* \* \* \* \*